United States Patent [19]
York et al.

[11] Patent Number: 5,525,978
[45] Date of Patent: Jun. 11, 1996

[54] GRAPHICAL KEY MANAGER FOR COMPUTER

[75] Inventors: Dennis C. York; Evan P. Smouse, both of Corvallis, Oreg.

[73] Assignee: Hewlett-Packard Company, Palo Alto, Calif.

[21] Appl. No.: 203,150

[22] Filed: Feb. 28, 1994

[51] Int. Cl.$^6$ ................................................ H03K 17/94
[52] U.S. Cl. ........................... 341/22; 341/26; 395/159; 395/155
[58] Field of Search ............................ 341/20, 22, 21; 395/159, 155, 157; 345/118, 168, 115, 116; 364/709.14

[56] References Cited

U.S. PATENT DOCUMENTS

| | | | |
|---|---|---|---|
| 5,181,029 | 1/1993 | Kim | 241/20 |
| 5,220,675 | 6/1993 | Padawer et al. | 395/800 |
| 5,287,514 | 2/1994 | Gram | 395/700 |

OTHER PUBLICATIONS

Dieter Brors: "Geschenkte Perlen", C'T Magazin Fur Computer Technik, No. 12, Dec. 1993, Hannover, DE pp. 60–61, p. 61, left column, last paragraph, middle column, paragraph 1.

Steve Bass: "Windows Shareware", PC World, Aug. 1992, San Francisco US, pp. 174–182, p. 177, middle column, line 11–line 34.

*Mastering Windows*, Robert Cowart, Copyright 1993 pp. 79–80, 86–87, 458–459, 697–699.

*Primary Examiner*—Brent A. Swarthout
*Assistant Examiner*—Ashok Mannava
*Attorney, Agent, or Firm*—Curtis G. Rose

[57] ABSTRACT

A computer has an operating system with a graphical user interface. This computer also has a key manager for graphically associating objects, such as data or application programs, with keystrokes, such as Fn-Fx key combinations, where Fn is a special shift key and Fx is a numbered function key. A key group or folder contains icons which represent objects. This key group can be built or modified by the user by copying an icon contained in another program group or folder via a drag and drop or similar operation. The key manager interrogates the operating system for the contents of the key group, and receives a key array. The key array contains objects associated with keystrokes. The key manager then monitors the operating system for any keystrokes received from the user. Upon receipt of a keystroke, the key manager determines whether the keystroke is in the key group. If so, the key manager intercepts the keystroke from the operating system, and retrieves the object associated with the keystroke from the key array. If the object is not already executing, the key manager executes the object.

11 Claims, 7 Drawing Sheets

| | | |
|---|---|---|
| Fn+F1 | C:\TSI\LLRST.EXE/S | 91 |
| Fn+F2 | C:\WINDOWS\WINFILE.EXE | 92 |
| Fn+F3 | C:\WINWORD\WINWORD.EXE MYREPORT.DOC | 93 |
| Fn+F4 | C:\EXCEL\EXCEL.EXE/P C:\EXCEL | 94 |
| Fn+F5 | | 95 |
| ⋮ | | |
| Fn+F12 | | |

FIG. 7

GRAPHICAL KEY MANAGER FOR COMPUTER

FIELD OF THE INVENTION

This invention relates to the electronics circuitry field. More particularly, this invention is a graphical key manager for a computer.

BACKGROUND OF THE INVENTION

A computer normally has a set of function keys(e.g. F1–F12, PF1—PF10, etc). The function these keys perform, either when pressed alone or in combination with a Shift, Ctrl, Alt, Command, or similar key, are available to be defined by the application currently running on the computer. For example, the PC application PC-File 7 defines the "F1" key to be context sensitive help, while the "ALT-F1" key combination is defined to be general help. Since these key definitions are normally under the control of the application and transparent to the user, they work well and pose little difficulty. However, these keys are only useful once the application is running.

Some computers, such as the Omnibook family of computers sold by Hewlett-Packard, include a special shift key called a "Fn" key. This key, when pressed in combination with a function key, allows for quick access to applications. This key combination makes it easy to execute and switch between multiple applications, and is particularly useful when an operating system with a graphical user interface, such as Microsoft Windows, is used.

The Omnibook 300 computer comes pre-installed with specific application programs, such as Microsoft Word for Windows and Microsoft Excel, and preassigns the key combinations discussed above to allow quick access to these applications. Since the Omnibook 300 computer preinstalled all application programs a user was likely to want, no support was provided to allow users an easy way to modify these preassigned key combinations. While it would be possible for a user to modify these preassigned key combinations by editing an internal Windows file, this task requires considerable skill and knowledge about the inner workings of the operating system. Even for experienced users who knew what this file was called and where it could be found, editing it could prove to be a daunting, painful, error prone task. Unless this file is edited correctly, one or possibly all key combinations could be rendered useless, or, when pressed, could even cause the computer to cease to operate. While this problem is present on computers with preassigned but modifiable function key combinations, it is especially acute on computers with no preassigned function key combinations, where users are expected to do this dangerous assignment themselves.

SUMMARY OF THE INVENTION

A computer has an operating system with a graphical user interface. This computer also has a key manager for graphically associating objects, such as data or application programs, with keystrokes, such as Fn-Fx key combinations, where Fn is a special shift key and Fx is a numbered function key. A key group or folder contains icons which represent objects. This key group can be built or modified by the user by copying an icon contained in another program group or folder via a drag and drop or similar operation. The key manager interrogates the operating system for the contents of the key group, and receives a key array. The key array contains objects associated with keystrokes. The key manager then monitors the operating system for any keystrokes received from the user. Upon receipt of a keystroke, the key manager determines whether the keystroke is in the key group. If so, the key manager intercepts the keystroke from the operating system, and retrieves the object associated with the keystroke from the key array. If the object is not already executing, the key manager executes the object.

DETAILED DESCRIPTION OF THE PREFERRED EMBODIMENT

Figure 1:
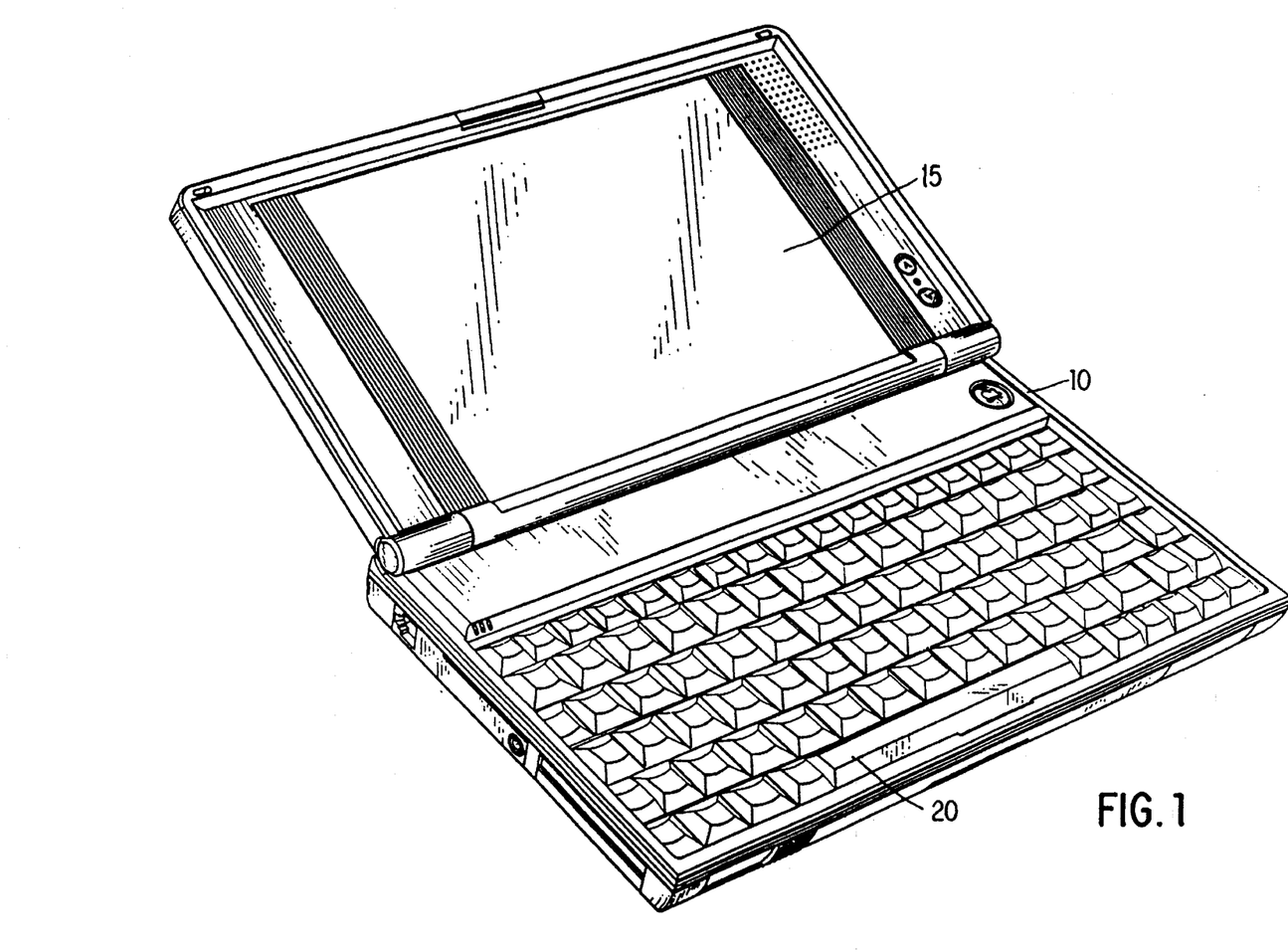
FIG. 1 shows a computer of the preferred embodiment of the invention.

FIG. 1 shows a computer of the preferred embodiment of the invention. Computer 10 has display 15 and keyboard 20. For purposes of this invention, computer 10 could be any computer with a display and a keyboard, provided the computer is suitably programmed to practice the invention as described herein.

Figure 2:
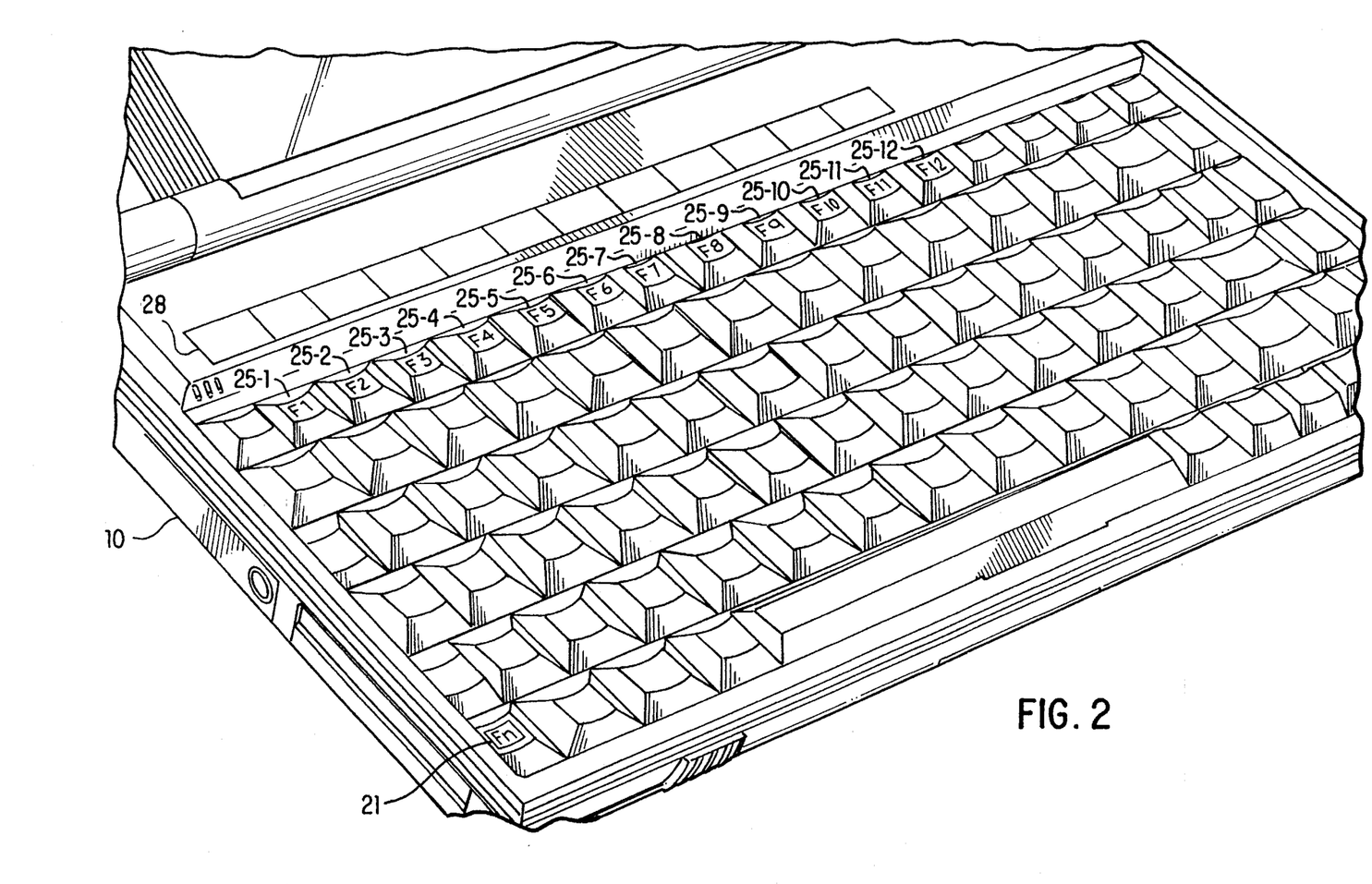
FIG. 2 shows a portion of the computer of the preferred embodiment of the invention in more detail.

FIG. 2 shows a portion of the computer of the preferred embodiment of the invention in more detail. Keyboard 20 contains Fn key 21 and function keys 25-1 to 25-12. When Fn key 21 is activated, usually by being pressed and held (like a shift key) while one function key is pressed and released, quick access to a particular application is provided to the user. For the purposes of this invention, the act of pressing any single key (such as a function key) or a key sequence (such as a Shift, Alt, Ctrl, Command or Fn key in addition to a function key) shall be referred to herein as a keystroke, although those skilled in the art will appreciate that a single keystroke may actually contain multiple scan codes sent to the computer from the keyboard. Label area 28 allows users to identify the application associated with each function key sequence by affixing a label containing the name, icon, or other identifying indicia of the application program.

Figure 3:
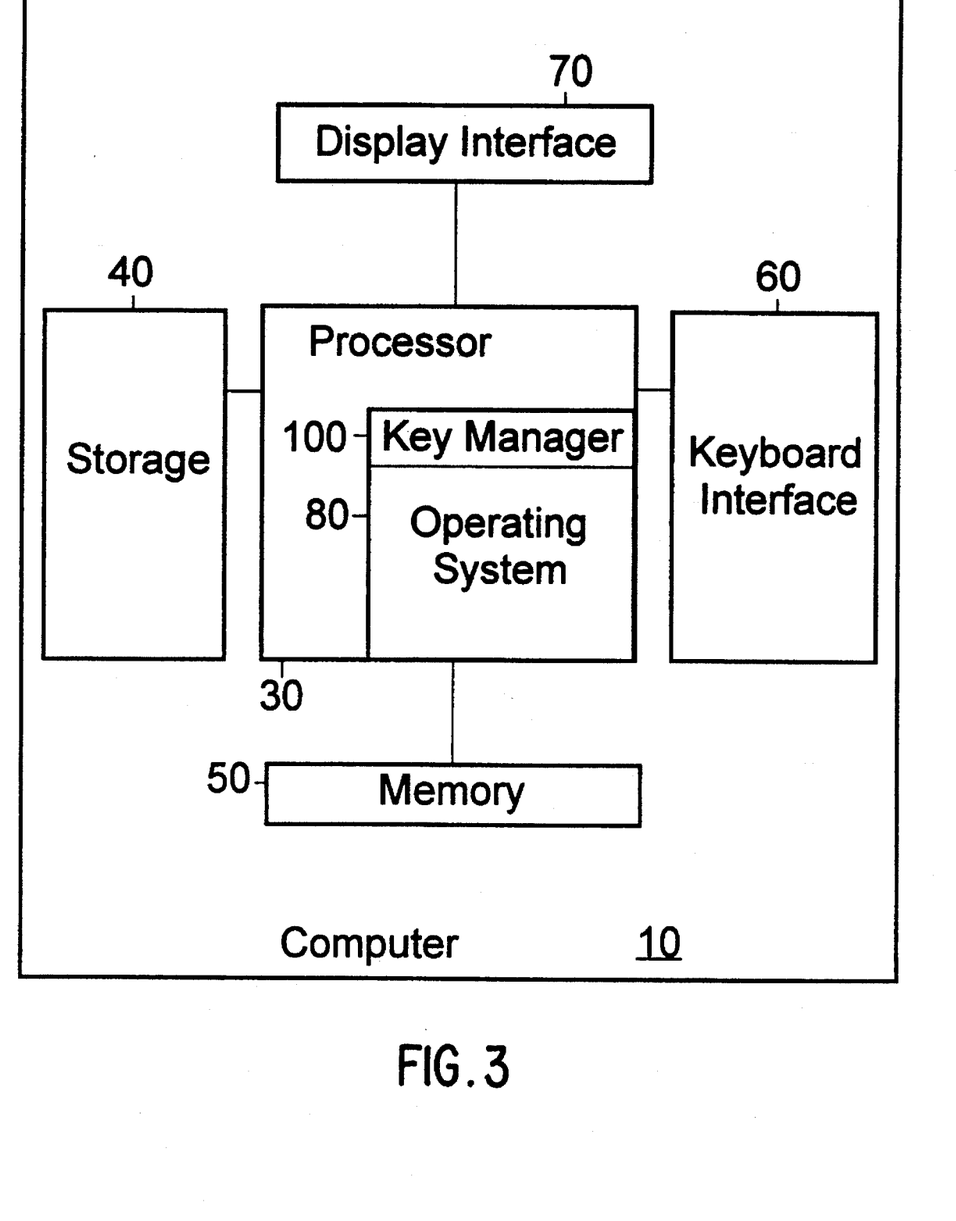
FIG. 3 shows a block diagram of the computer of the preferred embodiment of the invention.

FIG. 3 shows a block diagram of the computer of the preferred embodiment of the invention. Computer 10 contains processor 30 connected to storage 40, memory 50, keyboard interface 60, and display interface 70. In the preferred embodiment, processor 30 is a 486SLC/e processor, although an Intel 80486 or other processor could also be used.

When computer 10 is running, operating system 80 and key manager 100 are executed by processor 30. While this is shown pictorially in FIG. 3 as being a part of processor 30, those skilled in the art will appreciate that operating system 80 and key manager 100 are actually stored in storage 40, with portions copied into memory 50 and processor 30 as needed. In the preferred embodiment, operating system 80 is the Windows 3.1 Operating System by Microsoft, although other operating systems, such as a UNIX-based or an Apple-based operating system, could also be used. Processor 30 is suitably programmed to execute the flowcharts of FIGS. 4 and 5 to initialize and execute key manager 100.

Figure 4:
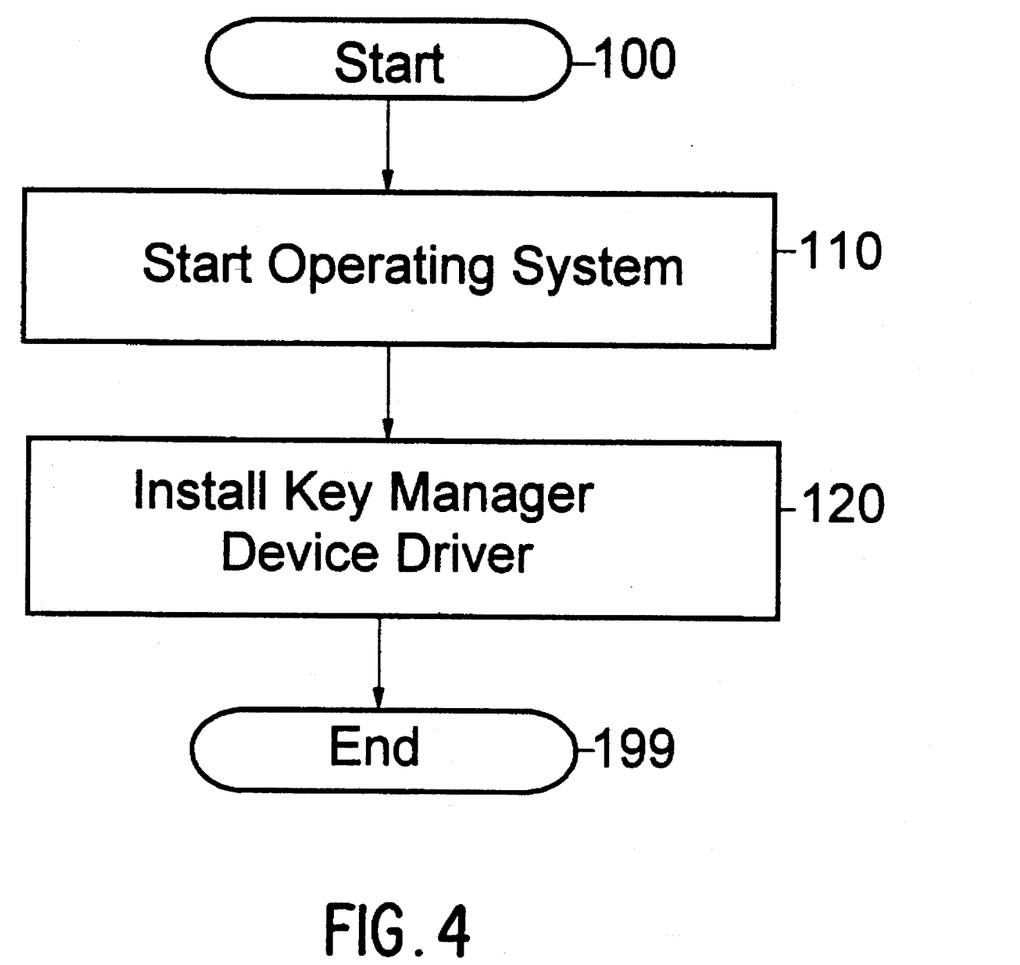
FIG. 4 shows a flowchart of the initialization of the key manager of the preferred embodiment of the invention.
Figure 5:
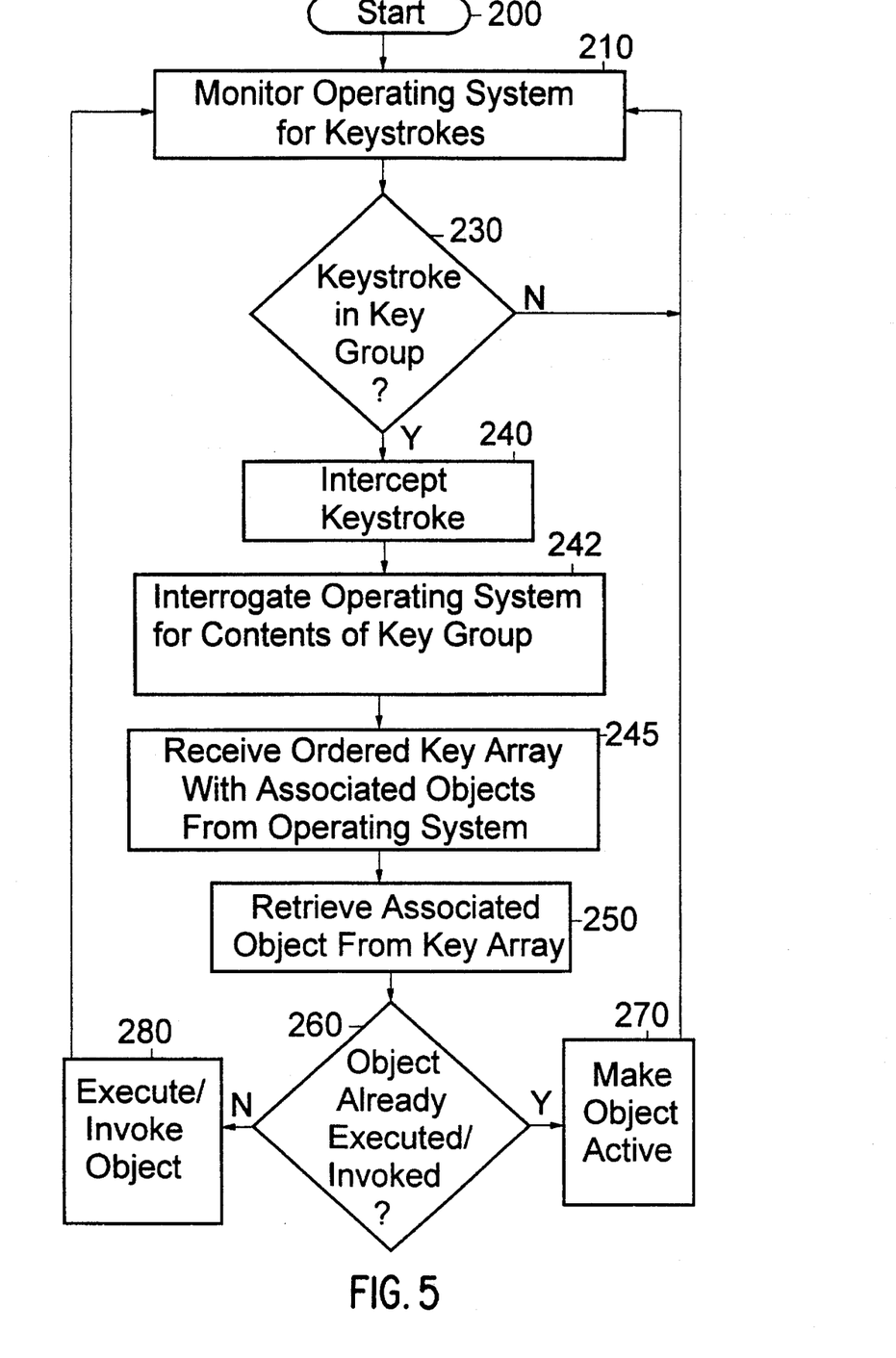
FIG. 5 shows a flowchart of the operation of the key manager of the preferred embodiment of the invention.

FIG. 4 shows a flowchart of the initialization of the key manager of the preferred embodiment of the invention. Block 110 starts the operating system. In the preferred embodiment, this is done by placing a line in the AUTOEXEC.BAT file to start Windows upon system reboot, although this step could be performed manually under user direction by typing WIN at the C: prompt. Block 120 installs the key manager device driver. The function performed by the key manager device driver is shown in FIG. 5, and will be discussed in more detail later. In the preferred embodiment, the key manager device driver is installed by including the name of the key manager device driver on the "DRIVERS=" line on the Windows internal file SYSTEM.INI. After block 120 is executed, the program ends in block 199. Note that FIG. 4 is only executed once each time the operating system is started.

FIG. 5 shows a flowchart of the operation of the key manager of the preferred embodiment of the invention. Block 210 monitors the operating system for any keystrokes received from the user. In the preferred embodiment, this is done by hooking the Windows Keyboard Message Queue, looking for messages indicating a keystroke was received.

Figure 6:
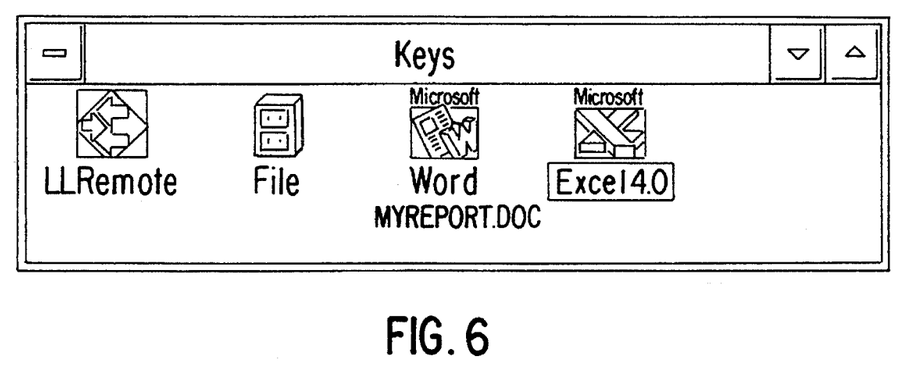
FIG. 6 shows an exemplary screen group of the preferred embodiment of the invention.

When the Keyboard Message Queue indicates that a keystroke was received, block 230 asks if the keystroke received was in the key group. For purposes of this invention, a "key group" is a group of graphically displayed icons representing objects (e.g. data, application programs) associated with keystrokes. An exemplary key group is shown in FIG. 6. The key group shown in FIG. 6 contains four icons: an icon associated with the application program LLRemote, an icon associated with the application program File Manager, an icon associated with the MS Word for Windows data file "MYREPORT.DOC", and an icon associated with the application program MS Excel. The key group shown in FIG. 6 can be built or modified by the user by copying an icon contained in another program group or folder via a well known "drag and drop" or similar operation.

In the preferred embodiment, referring again to FIG. 5, block 230 looks for scancodes mapped to the Fn+F1 to Fn+F12 key combinations (e.g. hex 70 to hex 7B scancodes). If the keystroke received was not an Fn+Fx keystroke (where Fx is a function key from F1 ... F12), block 230 is answered negatively, and flow returns to block 210. If the keystroke received was a Fn+Fx keystroke, block 230 is answered affirmatively. Block 240 then intercepts the keystroke from the operating system.

Figure 7:
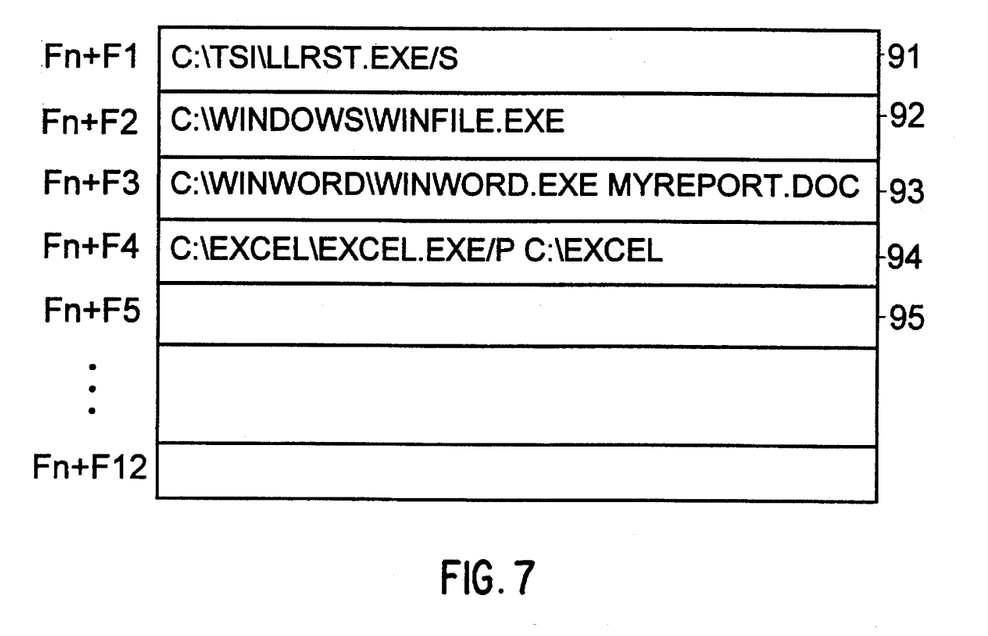
FIG. 7 shows the key array corresponding to the exemplary screen group of FIG. 6.

Block 242 interrogates the operating system for the contents of the key group. In the preferred embodiment, this is done via a well known Windows Dynamic Data Exchange call. An ordered key array containing objects associated with keystrokes is received in block 245. In the preferred embodiment, an array of command lines contains the path and filename necessary to execute objects (data and/or application programs) is returned by the operating system. The order of the objects in the key array returned from the operating system corresponds to the order of the icons in the key group, as determined by the operating system. In the exemplary key group of FIG. 6, the icons are ordered from left to right. Therefore, the command line necessary to execute the LLRemote application program is returned as the first position in the key array, with the command lines for the File Manager application program, the MS Word for Windows data file "MYREPORT.DOC", and the Excel application program following sequentially in the key array. This key array is shown in FIG. 7.

Referring again to FIG. 5, block 250 retrieves the associated object from the key array. In the preferred embodiment, the Fn+F1 keystroke is associated with the first position in the key array, Fn+F2 with the second position in the key array, and so on, with keystroke Fn+F12 being associated with the twelfth position in the key array. For example, if the keystroke received is an Fn+F3 keystroke, line 93 of key array 90 (FIG. 7), the command line for the MS Word for Windows data file "MYREPORT.DOC" is retrieved in block 250. Those skilled in the art will appreciate that keystrokes other than those specified above can be associated with the key array, with the size of the key array varying accordingly, and still fall within the spirit and scope of the invention.

Block 260 checks to see if the object has already been executed or invoked. In the preferred embodiment, this is done by using a callback function to enumerate all tasks currently running in the Windows operating system environment. If the object has already been executed or invoked (e.g. MS Word for Windows has been started and is displaying the data file "MYREPORT.DOC" in a non-active window on the display, or as a minimized icon), block 270 makes the object active, and flow returns back to block 210. If block 260 determines that the object has not already been executed or invoked, block 280 executes or invokes the object. For example, if the MS Word for Windows data file "MYREPORT.DOC" has not been started and the user presses the Fn+F3 key sequence, block 280 would start MS Word for Windows and display "MYREPORT.DOC" in the active window. Flow then returns back to block 210. Block 210 continues to monitor the operating system for keystrokes until the operating system is shut down.

What is claimed is:

1. A method of graphically associating a plurality of objects with a plurality of keystrokes in a computer, said computer having an operating system with a graphical user interface, said method comprising the steps of:

copying a first icon representing a first object into a key group;

adding said first object to a first position of a key array for said key group;

automatically associating a first keystroke with said first position of said key array having said first object, said first keystroke being within a predetermined ranged of keystrokes;

copying a second icon representing a second object into said key group;

adding said second object to a second position of said key array for said key group:

automatically associating a second keystroke with said second position of said key array having said second object, said second keystroke being within said predetermined range of keystrokes;

monitoring for keystrokes received from a user;

upon receipt of a keystroke, determining whether said keystroke is within said predetermined range of keystrokes;

if said keystroke is within said predetermined range of keystrokes, retrieving the object associated with said keystroke from said key array; and executing said object associated with said keystroke.

2. The method of claim 1, wherein said executing step is responsive to the step of verifying that said object has not already been executed.

3. A key manager for graphically associating a plurality of objects with a plurality of keystrokes in a computer, said computer having an operating system with a graphical user interface, said graphical user interface having a key group, said key manager comprising:

means for copying a first icon representing a first object into said key group;

means for adding said first object to a first position of a key array for said key group:

means for automatically associating a first keystroke with said first position of said key array having said first object, said first keystroke being within a predetermined range of keystrokes;

means for copying a second icon representing a second object into said key group;

means for adding said second object to a second position of said key array for said key group;

means for automatically associating a second keystroke with said second position of said key array having said second object, said second keystroke being within said predetermined range of keystrokes;

means for monitoring for keystrokes received from a user;

upon receipt of a keystroke, means for determining whether said keystroke is in said predetermined range of keystrokes;

if said keystroke is in said predetermined range of keystrokes, means for retrieving the object associated with said keystroke from said key array; and     means for executing said object associated with said keystroke.

4. The key manager of claim 3, wherein said operating system is a Windows operating system.

5. The key manager of claim 4, wherein said key array further comprises a command line containing a path and filename necessary to execute or invoke said object.

6. The key manager of claim 5, wherein said keystroke is a Fn-Fx keystroke, where Fn is a special shift key and Fx is a numbered function key.

7. The key manager of claim 3, wherein said key group is a folder.

8. The key manager of claim 7, wherein said operating system is a UNIX-based operating system.

9. The key manager of claim 8, wherein said keystroke is a Fn-Fx keystroke, where Fn is a special shift key and Fx is a numbered function key.

10. The key manager of claim 7, wherein said operating system is an Apple-based operating system.

11. The key manager of claim 10, wherein said keystroke is a Fn-Fx keystroke, where Fn is a special shift key and Fx is a numbered function key.

\* \* \* \* \*